United States Patent [19]

Antonov

[11] Patent Number: 5,940,367
[45] Date of Patent: Aug. 17, 1999

[54] FAULT-TOLERANT BUTTERFLY SWITCH

[75] Inventor: Vadim Antonov, Belmont, Calif.

[73] Assignee: Pluris, Inc., Cupertino, Calif.

[21] Appl. No.: 08/744,356

[22] Filed: Nov. 6, 1996

[51] Int. Cl.[6] ............................................. H04L 12/437
[52] U.S. Cl. ........................ 370/218; 370/224; 370/427;
           370/404; 370/236; 370/225; 370/389; 340/827
[58] Field of Search ................................... 370/218, 221,
              370/222, 223, 224, 427, 404, 228, 236,
              216, 217, 225, 351, 389, 400, 401, 402,
                                    403, 229, 235; 340/827

[56] References Cited

U.S. PATENT DOCUMENTS

| 4,048,446 | 9/1977  | Hafner et al. .......................... 370/222 |
| 4,651,318 | 3/1998  | Luderer ..................................... 370/94 |
| 4,875,736 | 10/1989 | Brambilla ................................ 297/440 |
| 4,893,302 | 1/1990  | Hemmady et al. ..................... 370/427 |
| 4,968,977 | 11/1990 | Chinnaswamy et al. ............ 340/825.8 |
| 4,999,832 | 3/1991  | Chen et al. ........................... 370/85.14 |
| 5,040,173 | 8/1991  | Richards .................................. 370/54 |
| 5,341,364 | 8/1994  | Marra et al. ............................ 370/223 |
| 5,406,549 | 4/1995  | Kremer .................................... 370/224 |
| 5,471,623 | 11/1995 | Napolitano, Jr. ................... 395/200.03 |
| 5,504,747 | 4/1996  | Sweazy .................................... 370/403 |
| 5,521,591 | 5/1996  | Arora et al. ............................ 340/826 |
| 5,539,747 | 7/1996  | Ito et al. .................................. 370/235 |
| 5,542,048 | 7/1996  | Olnowich et al. ................. 395/200.15 |
| 5,550,818 | 8/1996  | Brackett et al. ..................... 370/427 X |

OTHER PUBLICATIONS

Yoon, H., et al., "A New Approach to Internetworking of Integrated Services Local Networks," International Conference on Distributed Computing Systems, West Berlin Sep. 21–25, 1987, no. Conf. 7, Sep. 21, 1987, Popescu–Zeletin, R.; Le Lann, G.; Kane, Kim K.H., pp. 390–397, XP000647422.

Yi–Yuan Lee, I., et al., "Ring–Connected Networks and Their Relationship to Cubical Ring–Connected Cycles and Dynamic Redundancy Networks," *IEEE Transactions on Parallel and Distributed Systems,* vol. 6, No. 9, Sep. 1995, pp. 988–996, XP000533970.

May, I.P., et al., "A Fast Restoration System for ATM–Ring–Based LANs," *IEEE Communications Magazine* vol. 33, No. 9, Sep. 1, 1995, pp. 90–98, XP000528014.

*Primary Examiner*—Brian Zimmerman
*Assistant Examiner*—William H. Wilson, Jr.
*Attorney, Agent, or Firm*—Pillsbury Madison & Sutro LLP

[57] ABSTRACT

The present invention allows a data packet to reach its destination by automatically routing the data packet around failed components by means of a simple and efficient routing algorithms. The present invention is directed to a method and apparatus for routing a data packet through a series of ring stations, a series of mid-switch routing elements, and end-switch routing elements. An apparatus according to the invention includes a first series of ring stations and routing elements that are adapted to communicate with each other, and formed in a ring. Each ring is paired with another ring that includes a second series of ring stations and routing elements that are also adapted to communicate with each other as described above to form a second ring, and thus the two rings forming a ring pair. Each routing element, mid-switch and end-switch, is adapted to switch the path of the data packet between the two rings. The present invention further requires vertical links connecting a routing element from one ring pair to another routing element from another ring pair. The vertical links are further adapted to pass the data packet between the ring pairs.

19 Claims, 14 Drawing Sheets

MID-SWITCH
ROUTING ELEMENTS

RING STATIONS

END-SWITCH ROUTING ELEMENTS

FAULT-TOLERANT BUTTERFLY SWITCH

TECHNICAL FIELD

This invention relates to data interconnect networks for carrying data between a plurality of data processing devices.

BACKGROUND OF THE INVENTION

Butterfly switches and rings with bypasses are well-known (the schematic diagrams are shown in FIGS. 1A and 1B, respectively) and are described in a number of computer architecture textbooks.

A butterfly switch as shown in FIG. 1A allows communication between N sources and N destinations with delay on the order of logarithm of N. The delay does not depend on relative positions of source and destination; and the operation of the permutation devices (shown as boxes in FIG. 1A) is very simple, so a hardware implementation is cheap and efficient. An important characteristic of a butterfly switch is its linear scalability, i.e. an arbitrarily large switch can be built so the aggregate throughput of the switch grows linearly with the number of inputs or outputs. However, a failure of a single component of a butterfly switch causes significant degradation of end-to-end connectivity because every single permutation device and all corresponding links are present in multiple source-destination paths. Consequently, although they are simple and efficient, butterfly switches have found limited use because they lack fault tolerance.

A ring with bypasses is shown in FIG. 1B. A ring with bypasses has redundant links bypassing every element of the ring, so if an element has failed, the connectivity will still be preserved. A ring with bypasses can handle failures of arbitrary numbers of elements, as long as failed elements are not adjacent. Ring-based data interconnects, however, are not linearly scalable, i.e. they have aggregate throughput limited by the speed of a single connection.

FIG. 1C shows a wrapped butterfly switch, wherein the permutation devices in the first and the last rows of a butterfly switch are merged. Like the original butterfly switch, the wrapped butterfly switch is not fault-tolerant.

Other interconnect topologies comparable to butterfly switches in terms of linear scalability include hypercubes (shown in FIG. 1D), fat trees (shown in FIG. 1E), and multibutterflies (as described in U.S. Pat. No. 5,521,591 to Arora et al. (1996).

Hypercubes are fault-tolerant in most cases, but require relatively complicated routing algorithms and multi-port switching elements which limit the size of a switch by the design limitations of the switching elements. Existing commercial implementations of hypercube switches (such as by nCUBE Corp., Beaverton, Oreg.) are relatively slow and do not support parallel data ports due to the prohibitively large number of pins required. Moreover, routing through a hypercube does not yield consistent latency due to its different path lengths.

Fat trees are generally comparable to hypercubes in terms of complexity and fault tolerance.

A detailed description and discussion of the aforementioned interconnect topologies can be found in *Introduction To Parallel Algorithms And Architectures: Arrays, Trees, Hypercubes* by F. Thomson Leighton, Morgan Kaufmann Publishers, 1992.

There are numerous works of prior art augmenting the aforementioned basic data interconnect technologies to improve fault tolerance or performance by replicating basic switching networks or adding redundant links and switching equipment. The common drawback of all those works is that they increase complexity even more, thus making very high speed implementations expensive or impossible. Those works include: U.S. Pat. No. 5,521,591 to Arora et al. (1996) describing a multibutterfly-based data interconnect; U.S. Pat. No. 4,968,977 to Chinnaswamy et al. (1990) and U.S. Pat. No. 4,651,318 to Luderer (1987) describing non-linearly scalable modular crossbar data interconnects; U.S. Pat. No. 5,471,623 to Napolitano (1995) describing a bi-directional packet switch; and a number of relevant works related to connection-oriented data networks, U.S. Pat. No. 5,040,173 to Richards (1991), U.S. Pat. No. 4,875,736 to Posner and Smyth (1989) and U.S. Pat. No. 5,542,048 to Olnowich et al. (1996).

SUMMARY OF THE INVENTION

Accordingly, the objects and advantages of the present invention are:

(a) to simplify and streamline routing of data packets to allow very high speed implementations;

(b) to allow inexpensive very high speed implementations based on programmable logical devices and other off-the-shelf integrated circuits;

(c) to achieve high reliability without introducing significant amounts of redundant hardware;

(d) to achieve linear scalability of the switch's throughput; and (e) to achieve higher flexibility of configurations.

These and other objects and advantages of the present invention are achieved by combining topologies of a butterfly switch and a ring with bypasses, thus allowing data packets which were not delivered to their destination by the butterfly switch due to a failure of a link or a switching element to be cycled back to the input of the switch for delivery by way of an alternative path. The system includes a plurality of mid-switch routing elements, end-switch routing elements and ring stations interconnected with ring links and vertical links. The described method of operation provides loop-free operation and automatic misrouting around failed components, given the described topology.

Accordingly, the reader will see that the fault-tolerant butterfly switch can commutate data packets even in a case of failure of its components by means of simple and efficient routing algorithms.

The prior art methods for achieving fault tolerance did not use the packet cycling facilitated by the topology of the present invention, and used relatively complicated topologies of redundant links instead.

DRAWINGS

DETAILED DESCRIPTION OF THE PREFERRED EMBODIMENT

Figure 2:
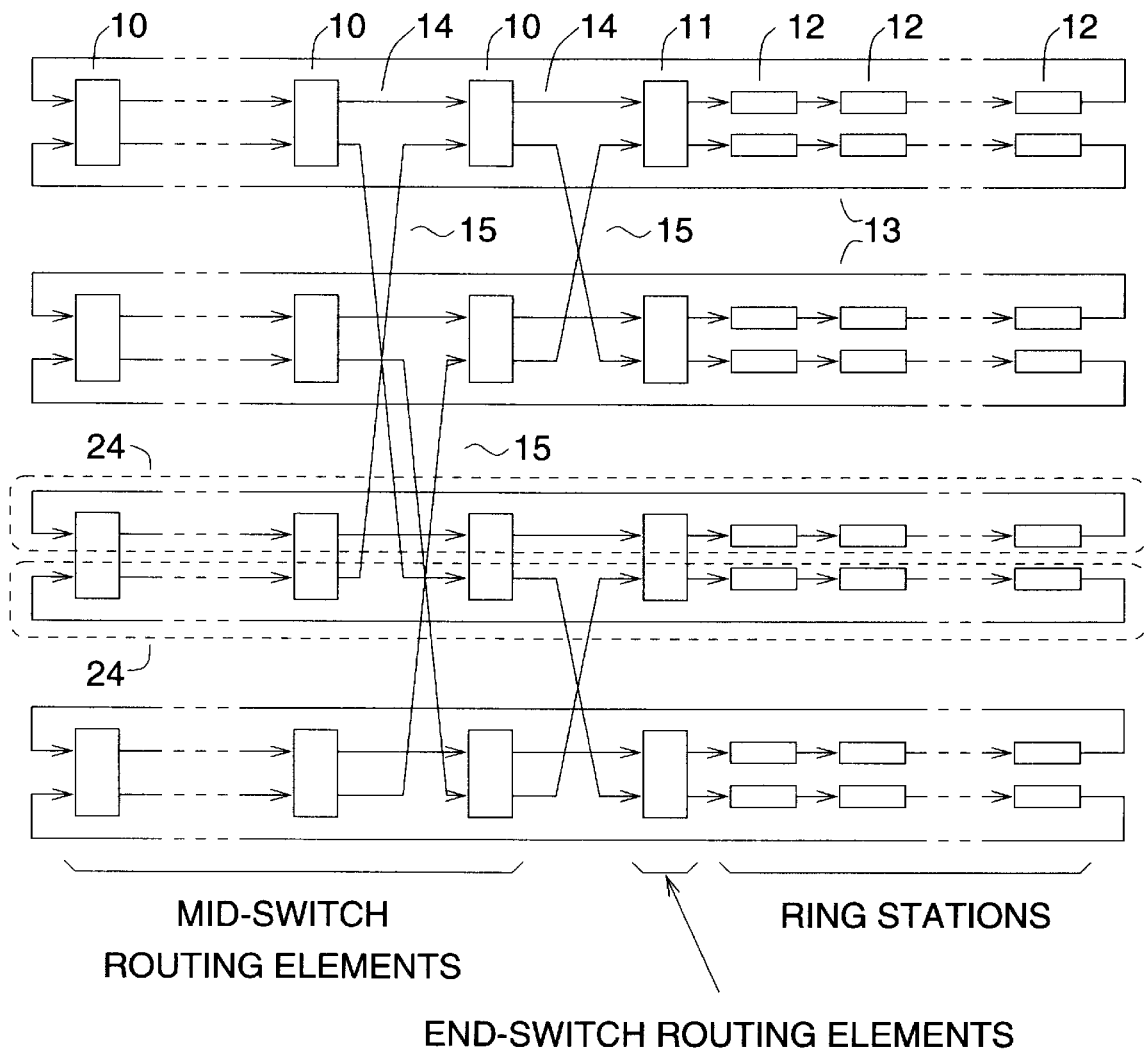
FIG. 2 is a schematic diagram depicting the overall topology of the fault-tolerant butterfly switch of the present invention.

The preferred embodiment of a fault-tolerant butterfly switch comprises a number of mid-switch routing elements 10, end-switch routing elements 11 and ring-stations 12 interconnected with ring links 13 and 14 and vertical links 15 as shown in FIG. 2. Ring stations 12 can send or receive data packets, and serve as both inputs and outputs of the switch, to connect to data sources and destinations (not shown in attached Figs.).

The ring links 13, 14 form a number of paired rings 24, with each ring 24 having N mid-switch routing elements 10, a single end-switch routing element 11, and an arbitrary number of ring stations 12. The output of the last ring station 12 is connected back to an input of the first mid-switch routing element 10 in the ring 24, with a feed-back ring link 13.

The positions of routing elements 10 and 11 on a ring 24 are numbered from zero, starting from the end-switch routing element 11, in a direction opposite to traffic flow (as shown with arrows). A position number of a vertical link 15 is the same as that of the preceding (traffic flow-wise) mid-switch routing element 10.

The ring pairs are numbered starting from 0 so that each ring pair has a unique ring pair number. The vertical links 15 form connections between ring pairs such that vertical links in position i connect rings whose ring pair numbers differ by $2^{i-1}$, e.g. vertical links in position 1 form connections between adjacent ring pairs, vertical links in position 2 form connections between ring pairs whose numbers differ by two, links in position 3 form connections between pairs whose numbers differ by four, and so on. There are a sufficient number of mid-switch routing elements 10 to interconnect all pairs of rings in the manner described above.

Every ring station 12 in the switch has a unique address which can be, for example, composed of an address uniquely identifying the station within the ring 24 (ring address), the identification of the ring 24 within the ring pair (ring selector), and the number of the pair of rings 24 (ring pair identifier).

Figure 1A:
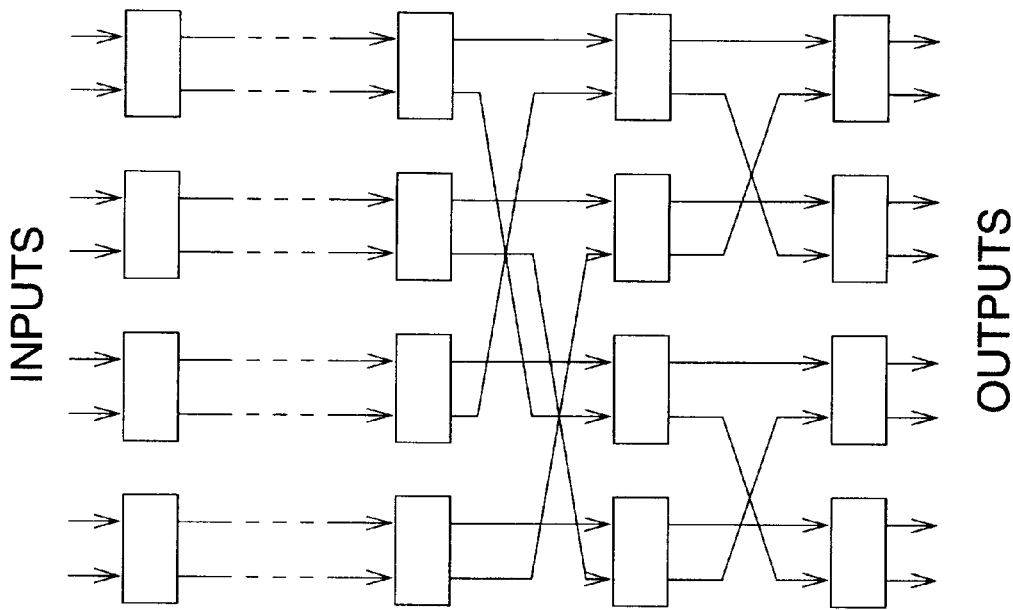
FIG. 1A is a schematic diagram depicting the topology of a butterfly switch.
Figure 1B:
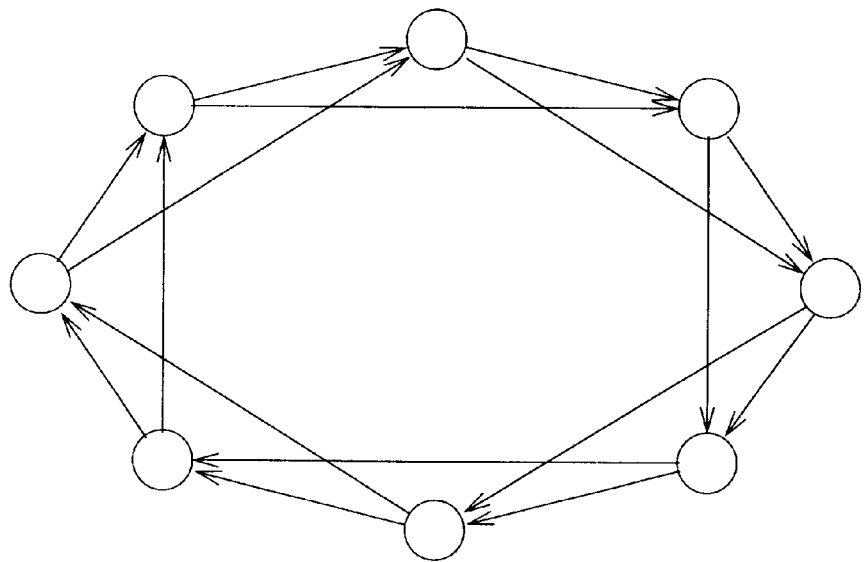
FIG. 1B is a schematic diagram depicting the topology of a ring with bypasses.
Figure 1C:
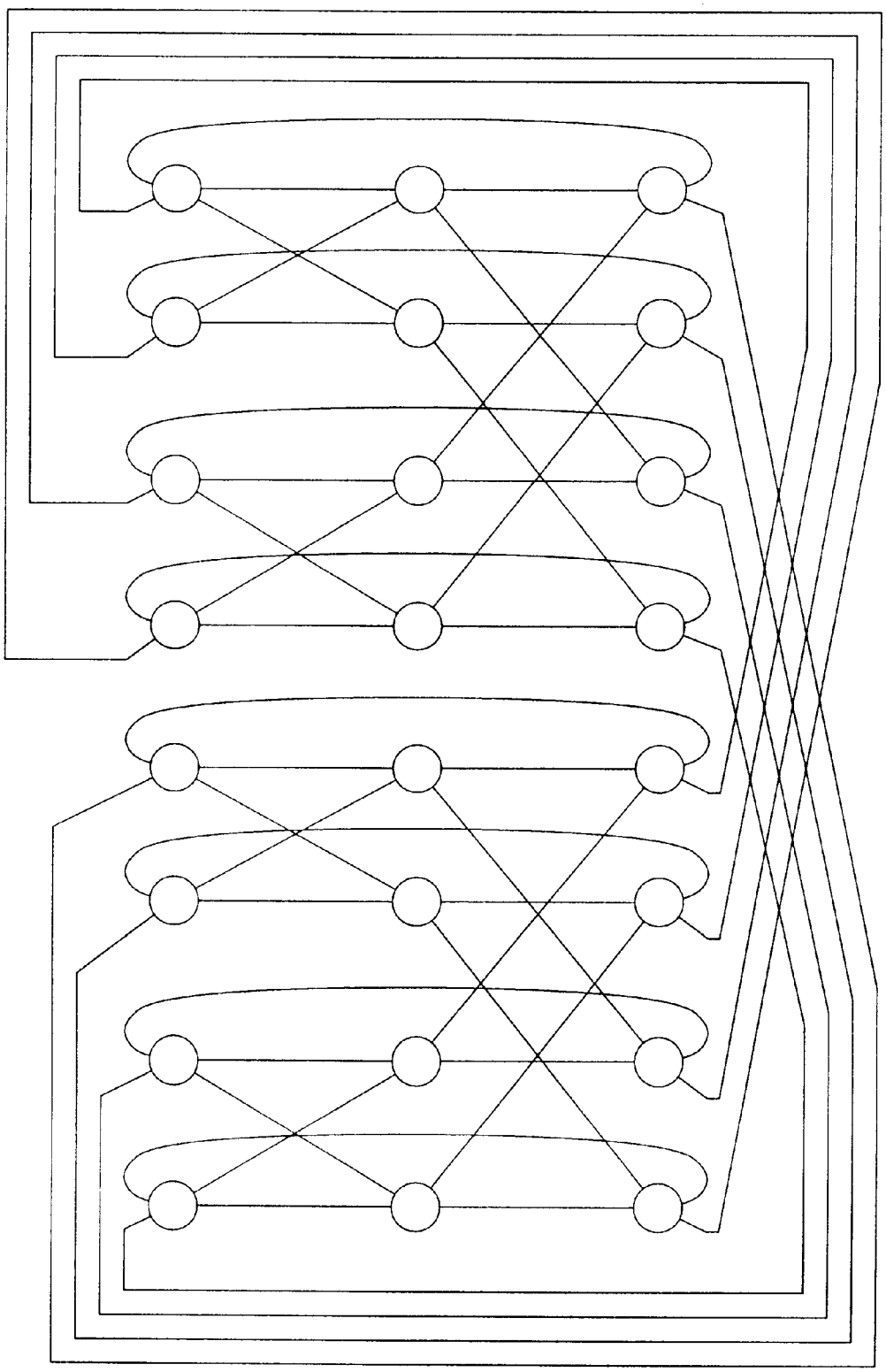
FIG. 1C is a schematic diagram depicting the topology of a wrapped butterfly switch.
Figure 1D:
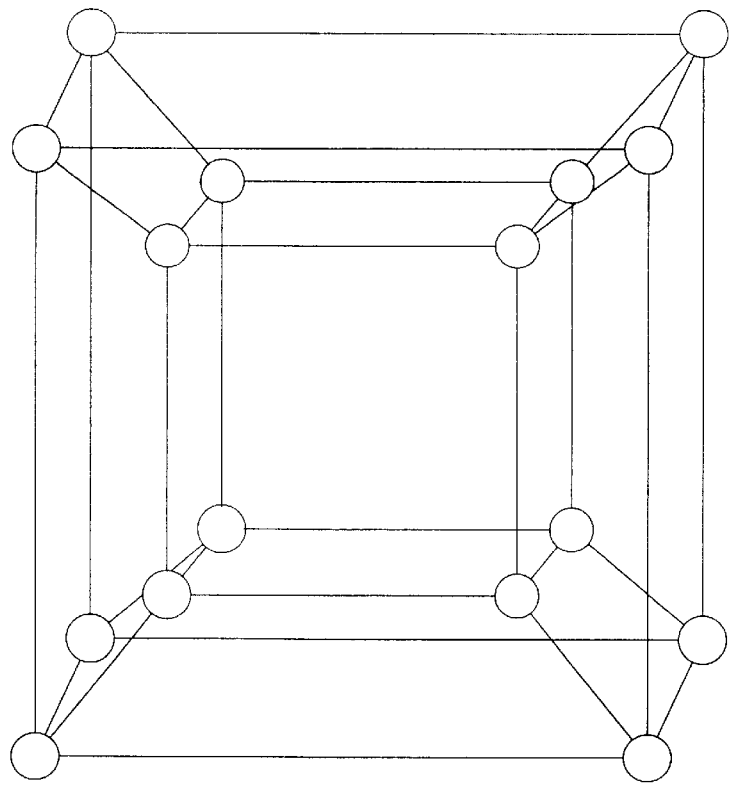
FIG. 1D is a schematic diagram depicting the topology of a hypercube.
Figure 1E:
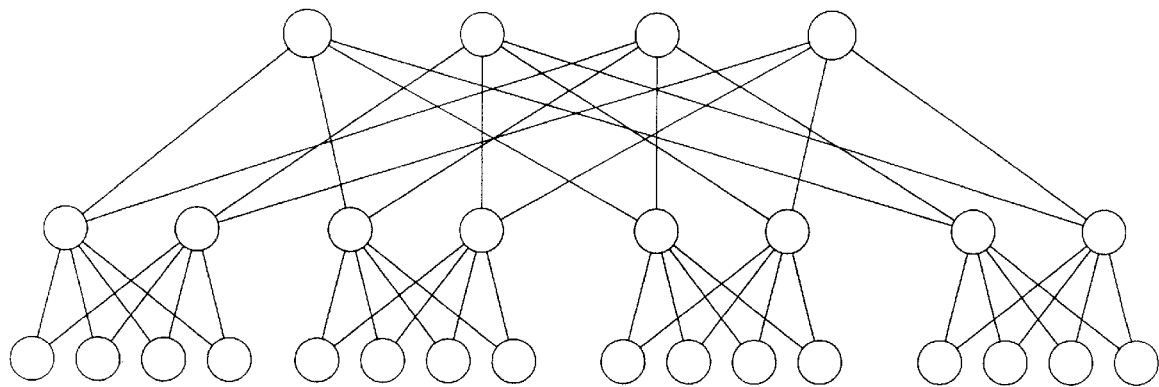
FIG. 1E is a schematic diagram depicting the topology of a fat tree.
Figure 3A:
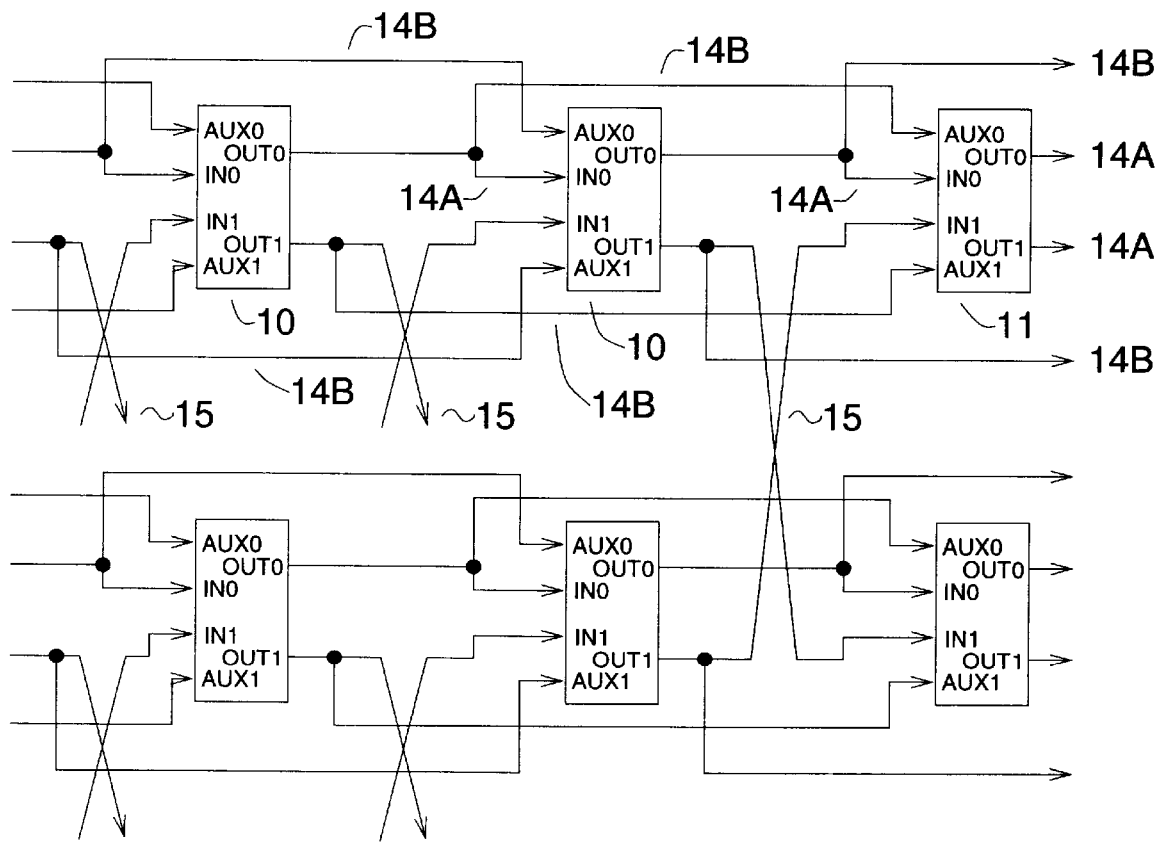
FIG. 3A is a detailed block diagram depicting ring connections between mid-switch and end-switch routing elements.
Figure 3B:
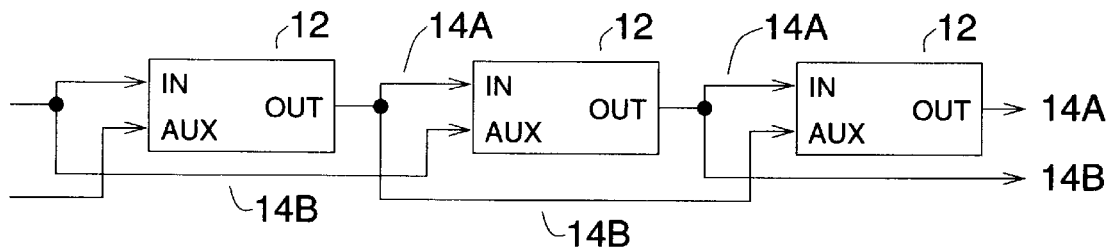
FIG. 3B is a detailed block diagram depicting ring connections between ring stations.

To provide redundancy, rings 24 are equipped with bypass ring links 14B, which are used in case of failure of primary ring links 14A, routing elements 10 or 11, or ring stations 12. The schematic diagram of interconnecting routing elements with bypass links is shown in FIG. 3A; note that vertical links 15 are inserted in place of primary ring links 14A corresponding to outputs OUT1 of mid-switch routing elements 10. Interconnection of ring station elements is shown in detail in FIG. 3B, and is the same as in the prior art (FIG. 1B).

Figure 4A:
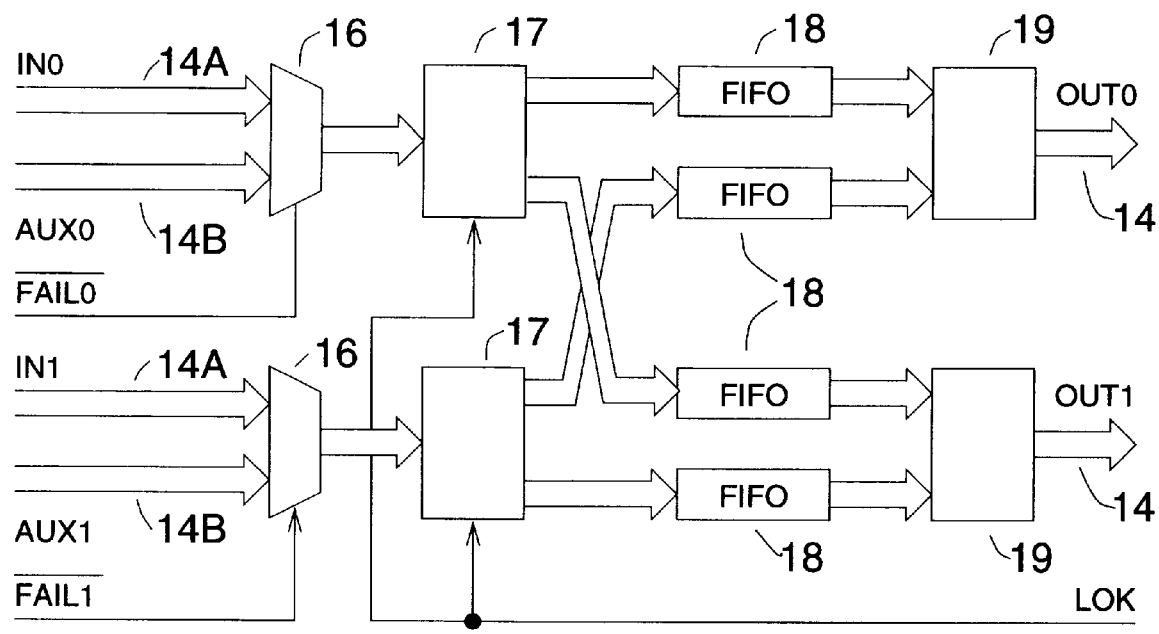
FIG. 4A is a block diagram depicting the internal structure of a routing element.

The structure of a mid-switch routing element 10 or an end-switch routing element 11 is shown in FIG. 4A. Every routing element 10 or 11 has two primary inputs (as shown in FIGS. 2 and 3A), two auxiliary inputs (as shown in FIG. 3A), and two outputs. The data inputs for primary 14A and auxiliary 14B ring links (marked as IN0, IN1 and AUX0, AUX1, correspondingly) are connected to multiplexors 16 controlled by signals coming from corresponding inputs $\overline{FAIL0}$ and $\overline{FAIL1}$. Multiplexors 16 select primary input (IN0, IN1) when the corresponding controlling signal is asserted.

The signals $\overline{FAIL0}$ and $\overline{FAIL1}$ indicate when a failure of a previous routing element 10 or ring station 12 is detected. The means for such detection are well-known in the art.

Two routing controllers 17 are connected to outputs of multiplexors 16 and every routing controller 17 has two outputs each associated with corresponding outputs of the routing element. Outputs of routing controllers 17 are connected to inputs of FIFO buffers 18, whose outputs in turn are connected to inputs of output arbiters 19. Outputs of output arbiters 19 (marked as OUT0 and OUT1), are connected to ring links 14 or vertical links 15, as shown in FIG. 3A.

The signal LOK (Line-OK) is asserted when the vertical link 15 connected to the output OUT1 of the mid-switch routing element 10 is in operational condition. This signal is not used by end-switch routing elements 11.

Figure 4B:
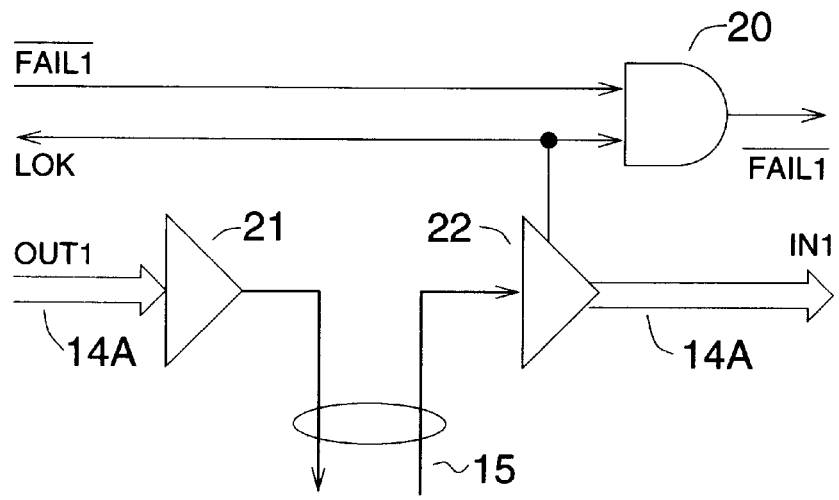
FIG. 4B is a block diagram depicting a half of a vertical link.

The schematic diagram of a vertical link 15 attachment is shown in FIG. 4B. The link 15 is driven by a transmitter 21 and a corresponding receiver 22 that is used to demodulate signals from the link 15. Transmitters 21 and receivers 22 of two such attachments in the different rings 24 are connected pairwise forming a cross-connected vertical link 15, as shown in FIG. 2. Additionally, receiver 22 produces the Line-OK signal, which is passed to the preceding mid-switch routing element 10, and is combined with the $\overline{FAIL1}$ input signal from the previous (traffic flow-wise) mid-switch routing element 10 by logical and gate 20 to produce output signal $\overline{FAIL1}$, to be connected to the $\overline{FAIL1}$ input of the next routing element 10 or 11. The output $\overline{FAIL1}$ signal thus combines indication of failure of a mid-switch routing element 10 with the indication of a vertical link 15 failure. In other words, a failed vertical link is interpreted by the following routing element as a failure of a ring 24 component, and a bypass ring link 14B will be used instead. Note also that $\overline{FAIL0}$ signal is not modified in any way by the inserted vertical link 15 attachment.

Figure 5A:
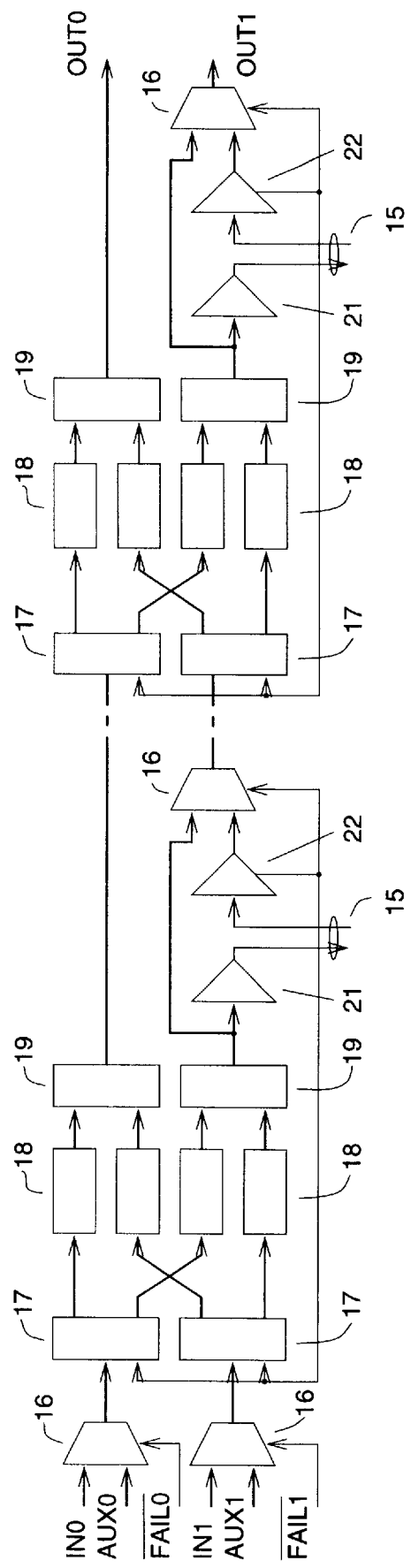
FIG. 5A is a block diagram depicting an assembly of several mid-switch routing elements.

FIG. 5A shows how several routing elements may be grouped in a single assembly, which form a single failure zone. Such assembly allows the reduction of the number of multiplexors 16 and eliminates separate logical and gates 20.

Figure 5B:
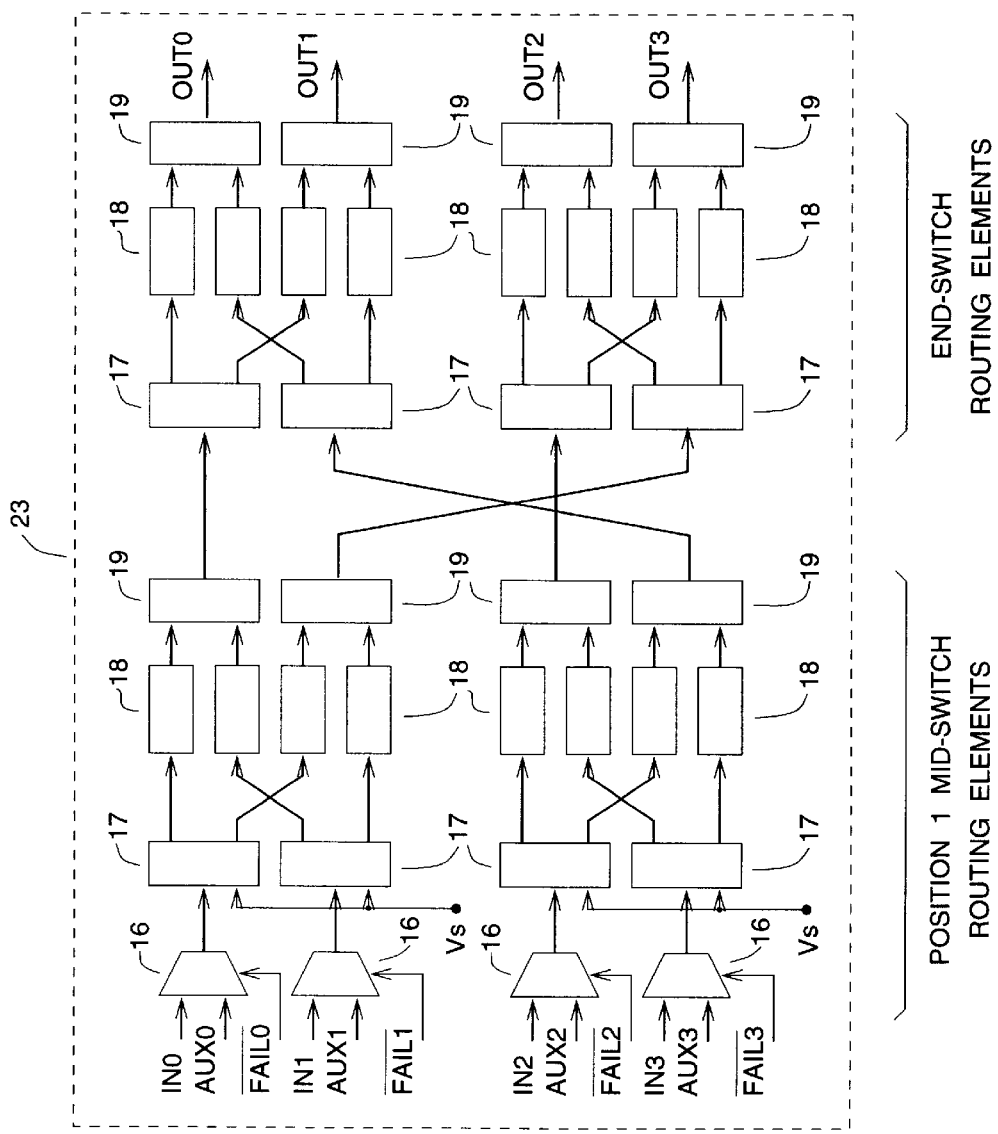
FIG. 5B is a block diagram depicting an assembly of pairs of mid-switch and end-switch routing elements.
Figure 5C:
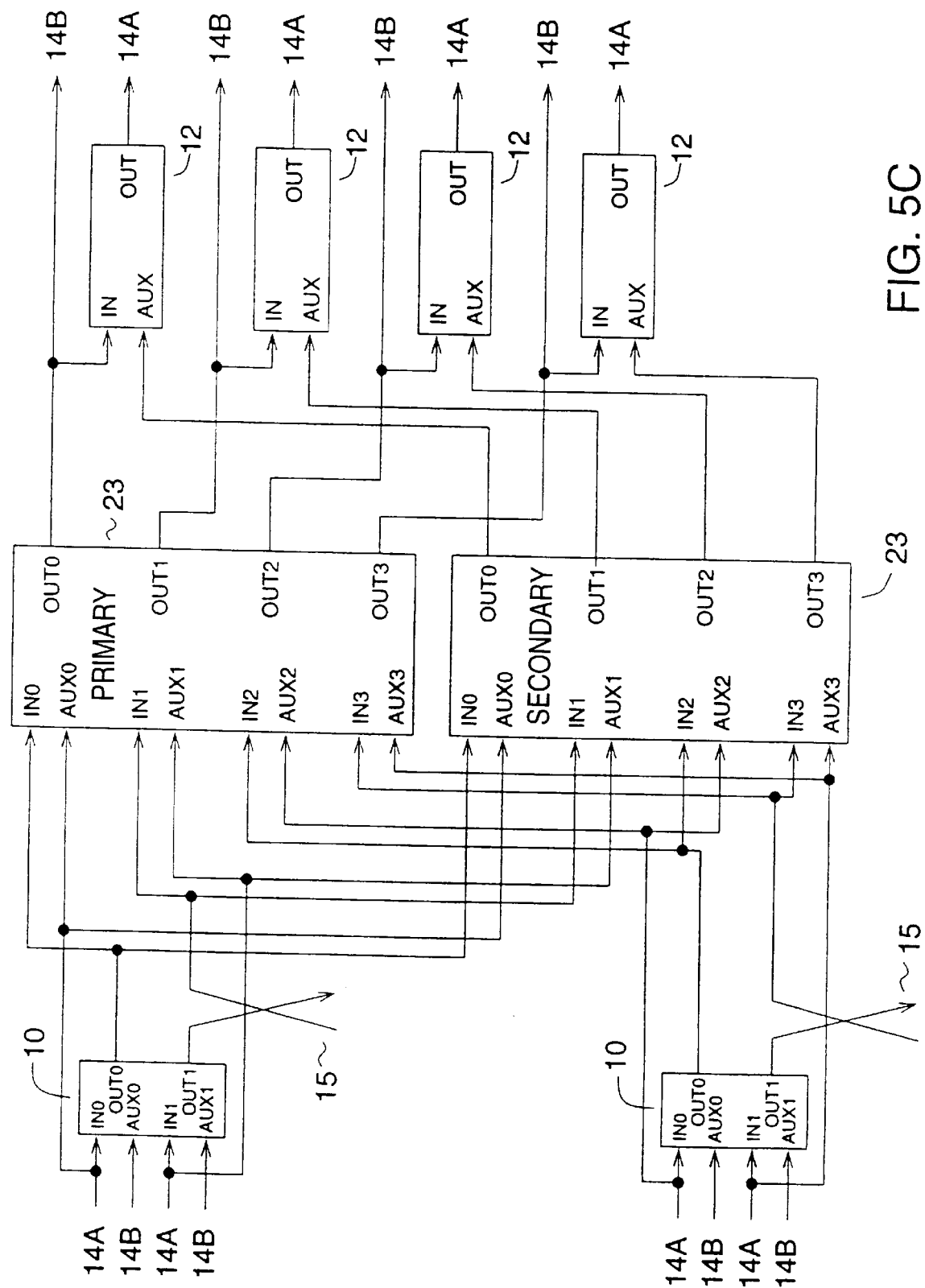
FIG. 5C is a block diagram depicting a fault-tolerant ring configuration including assemblies of pairs of mid-switch and end-switch routing.

Although FIG. 5A does not show an end-switch routing element 11, such an element may be substituted for the last mid-switch routing element except that the vertical link circuitry driving output OUT1 of the assembly is removed. FIG. 5B shows an assembly 23 of two position 1 mid-switch routing elements 10 (i.e. mid-switch routing elements closest to end-switch routing elements) and a pair of end-switch routing elements 11. FIG. 5C shows how two such assemblies 23 may be used in a fault-tolerant quadruple ring configuration (one assembly 23 is primary, another is hot standby secondary).

The structure of a ring station 12 is not discussed here, as it is a matter of common knowledge, and a large number of ring station devices are available commercially.

The fault-tolerant butterfly switch delivers data packets from source ring stations 12 to addressed destination ring stations 12. A data packet comprises the following fields, in arbitrary order:
destination address, which in turn comprises the following fields:
  destination ring address,
  destination ring selector (a single bit),
  destination ring pair identifier;
L-bit field (a single bit);
optional misrouting ring pair address;
optional M-bit field (a single bit);
payload data which is not interpreted by the switch in any way.

A preferred ordering of the fields is to place the payload data field after all other fields, so routing decisions can be made while the packet is still being received.

Figure 6A:
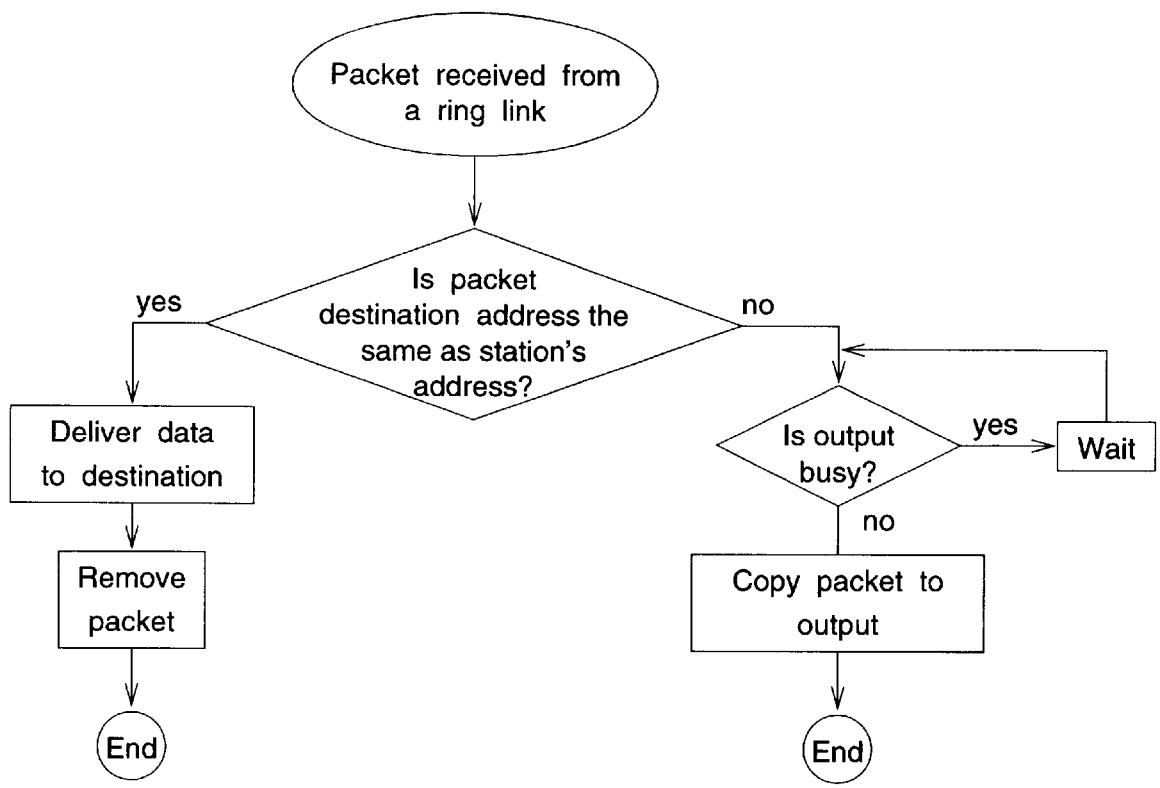
FIG. 6A is a flow-chart depicting the operation of a ring station upon receiving a data packet.
Figure 6B:
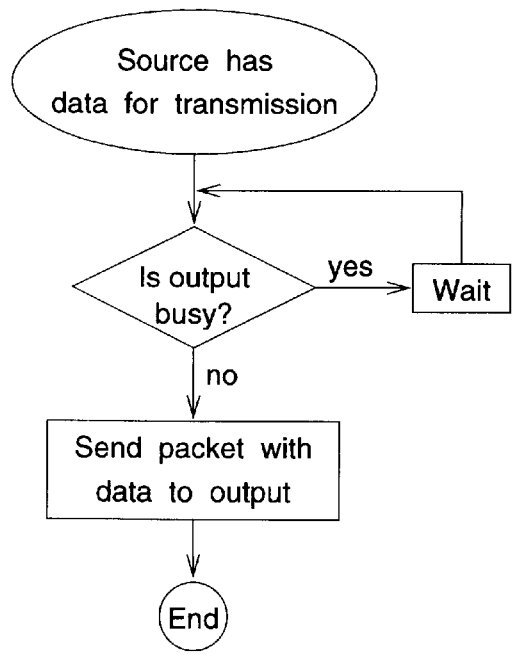
FIG. 6B is a flow-chart depicting the operation of a ring station when sending a data packet.

The operation of a ring station 12 is illustrated in FIGS. 6A and 6B. When a ring station 12 receives a data packet it compares the entire destination address of the packet with the ring station's 12 own address, and if the addresses are different, waits until the ring station's output is available and then copies the data packet to the output. If the addresses are identical, the ring station 12 delivers the packet's data to the data destination and removes the data packet.

To send a packet, a ring station 12 should wait until its output is available and then send the new data packet to the output. The output can be busy while another data packet is being sent or copied through. The data source is responsible for providing the destination address, and if forced misrouting is required, sets an M-bit and provides a misrouting ring pair identifier. The L-bit field initially is clear. The processes shown in FIGS. 6A and 6B are executed concurrently for every packet being transmitted, received or copied by the ring station 12.

A ring station 12 arbitrates the flow of packets through its output (i.e. selection of which data packet will be transmitted next) in a way that does not give preference to new packets over transit packets, as that would create unacceptable congestion at routing elements 10 and 11 within the switch. Strategies such as unconditionally preferring transit packets, or using a fair queueing arbitration algorithm are acceptable. Such strategies are well-known in the art.

Figure 7:
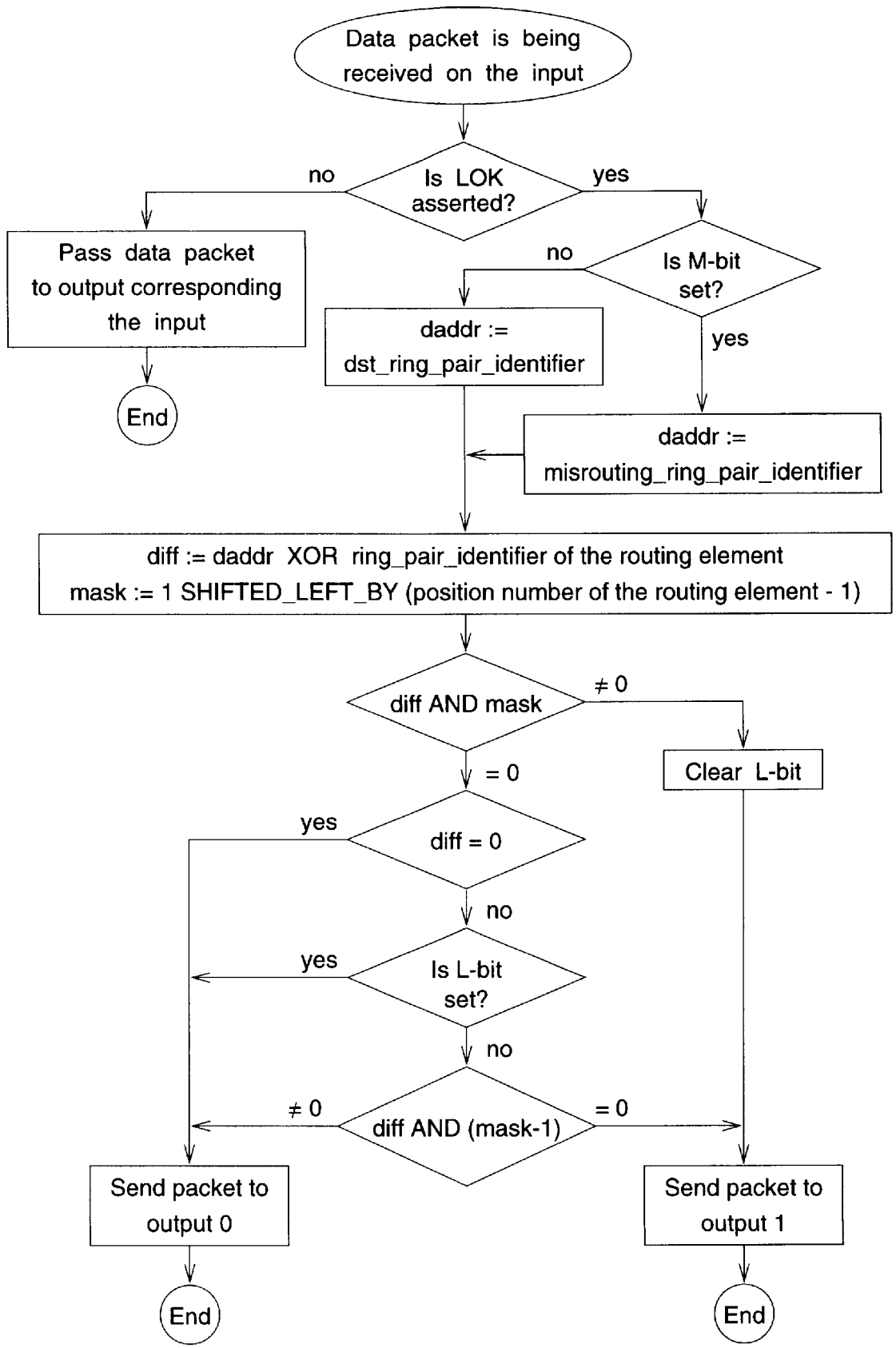
FIG. 7 is a flow-chart depicting the operation of a mid-switch routing element.

A mid-switch routing element's routing controller 17 operation is illustrated in FIG. 7. A mid-switch element's routing controller 17 can operate in two modes, depending on the state of signal LOK (Line OK). When LOK is not asserted (i.e. the vertical link 15 is not operational) the routing controller simply passes its input data to the output corresponding to the input of the mid-switch routing element 10; i.e. the mid-switch routing element 10 operates in bypass mode simply copying data from IN0 or AUX0 to OUT0 and from IN1 or AUX1 to OUT1.

When LOK is asserted (i.e. the vertical link 15 is operational) the routing controller 17 performs the following algorithm:

(1) Depending on the state of the M-bit of the packet, it chooses the destination ring pair identifier or mis-routing ring pair identifier for further operations (the resulting value is stored in register or variable daddr).
(2) The bit-wise exclusive or between daddr and the identifier of the ring pair identifier of the routing element 10 is stored in register or variable diff.
(3) Generate a mask comprising a word with all zeroes but a bit in the position corresponding to the routing element's position in the switch. (Note that mask can be a constant that does not have to be computed for every packet).
(4) If the bitwise logical and between diff and mask is not zero then clear the packet's L-bit field and send the packet to output OUT1 (processing of the packet ends).
(5) If diff equals zero or the packet's L-bit is set or the bitwise logical and between diff and (mask-1) is not zero then send the packet to output OUT0 (processing of the packet ends).
(6) Send packet to output OUT1 (processing of the packet ends).

Note that the automatic misrouting performed by the algorithm above (step 6, taken when condition in step 5 fails) is not performed when a vertical link 15 in position 1 is inoperable; thus a connectivity loss may occur. Therefore it is important to provide other means of redundancy for vertical links 15 in position 1, or to assemble pairs of mid-switch routing elements 10 in position 1 together with pairs of end-switch routing elements 11 on the same printed circuit board which would be treated as a singular failure zone.

Figure 8:
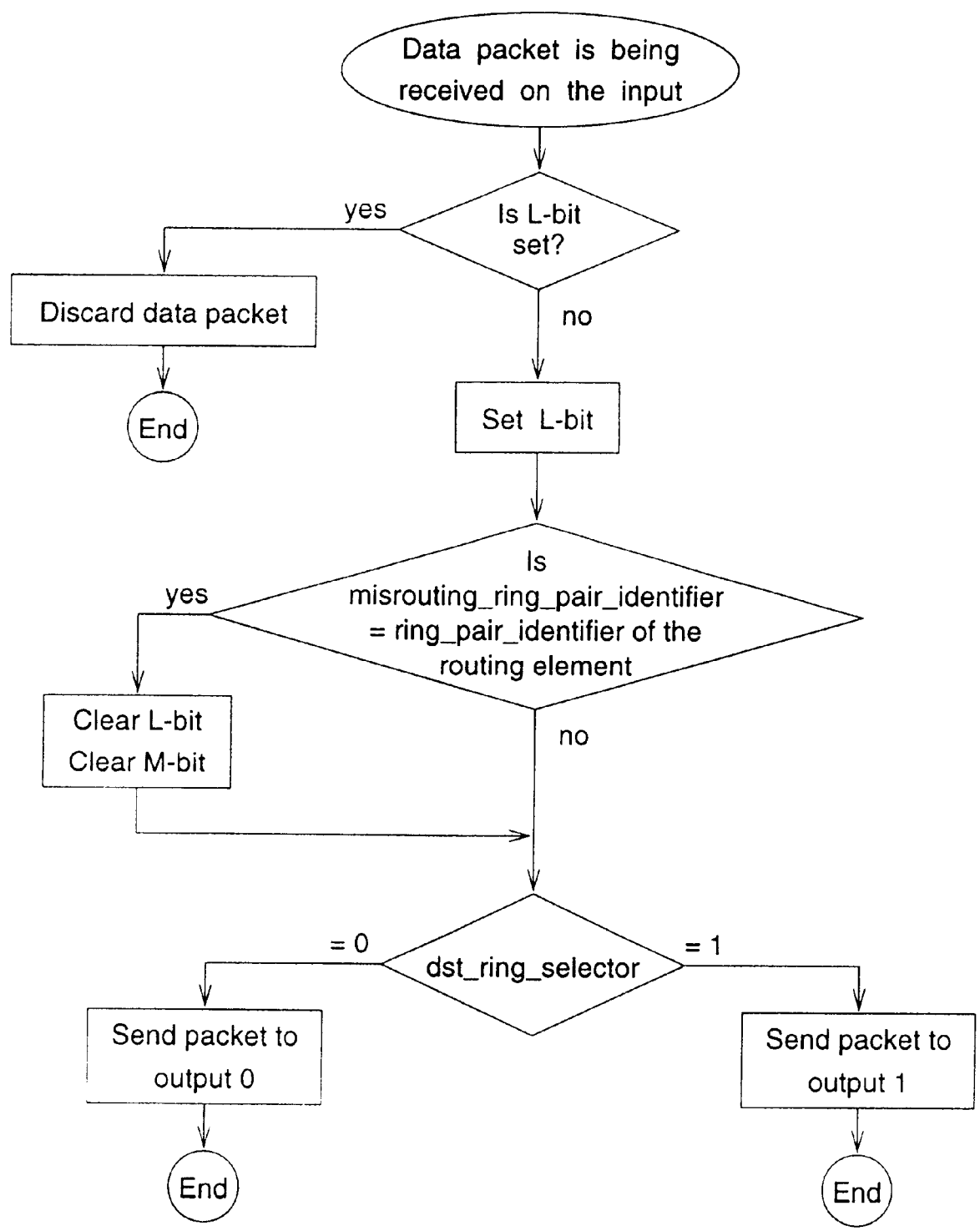
FIG. 8 is a flow-chart depicting the operation of a mid-switch routing element.

An end-switch routing element's routing controller 17 operation is illustrated in FIG. 8. Operation of the end-switch routing element's routing controllers does not depend on the state of signal LOK, so the corresponding circuit may be omitted.

An end-switch routing element's routing controller 17 performs the following algorithm after receiving a data packet:
(1) If the data packet has its L-bit set, the data packet is discarded (processing of the packet ends).
(2) Routing controller 17 sets the L-bit of the data packet.
(3) If the mis-routing ring pair identifier is equal to the ring pair number of routing element 11 then routing controller 17 clears the M-bit and L-bit fields of the data packet.
(4) If the data packet's destination ring selector is set, the packet is sent to output OUT1, otherwise it is sent to output OUT0; processing of the packet ends.

FIFO buffers 18 and output arbiters 19 of mid-switch routing elements 10 and end-switch routing elements 11 are identical. The FIFO buffer 18 accumulates incoming data if the corresponding output arbiter 19 does not accept incoming data on this input. If FIFO buffer 18 is full, it discards the incoming data packets, so those packets will not be delivered to the destination. If reliable delivery is necessary, a data source must have means to retransmit of the lost data. Such means are well-known in the art.

An output arbiter 19 copies data packets from one of its inputs to the output. When an entire packet is copied, the output arbiter 19 selects an input to copy the next packet in a way that ensures fairness. For example, the selection rule may be to maintain a counter which is incremented every time a data word is copied from input 0 and decremented when a data word is copied from input 1. When selection is to be made, output arbiter 19 selects the input 0 if the counter is negative and input 1 otherwise. If the FIFO buffer corresponding to the selected input contains no data, another input is selected and the counter is reset to zero.

Figure 9A:
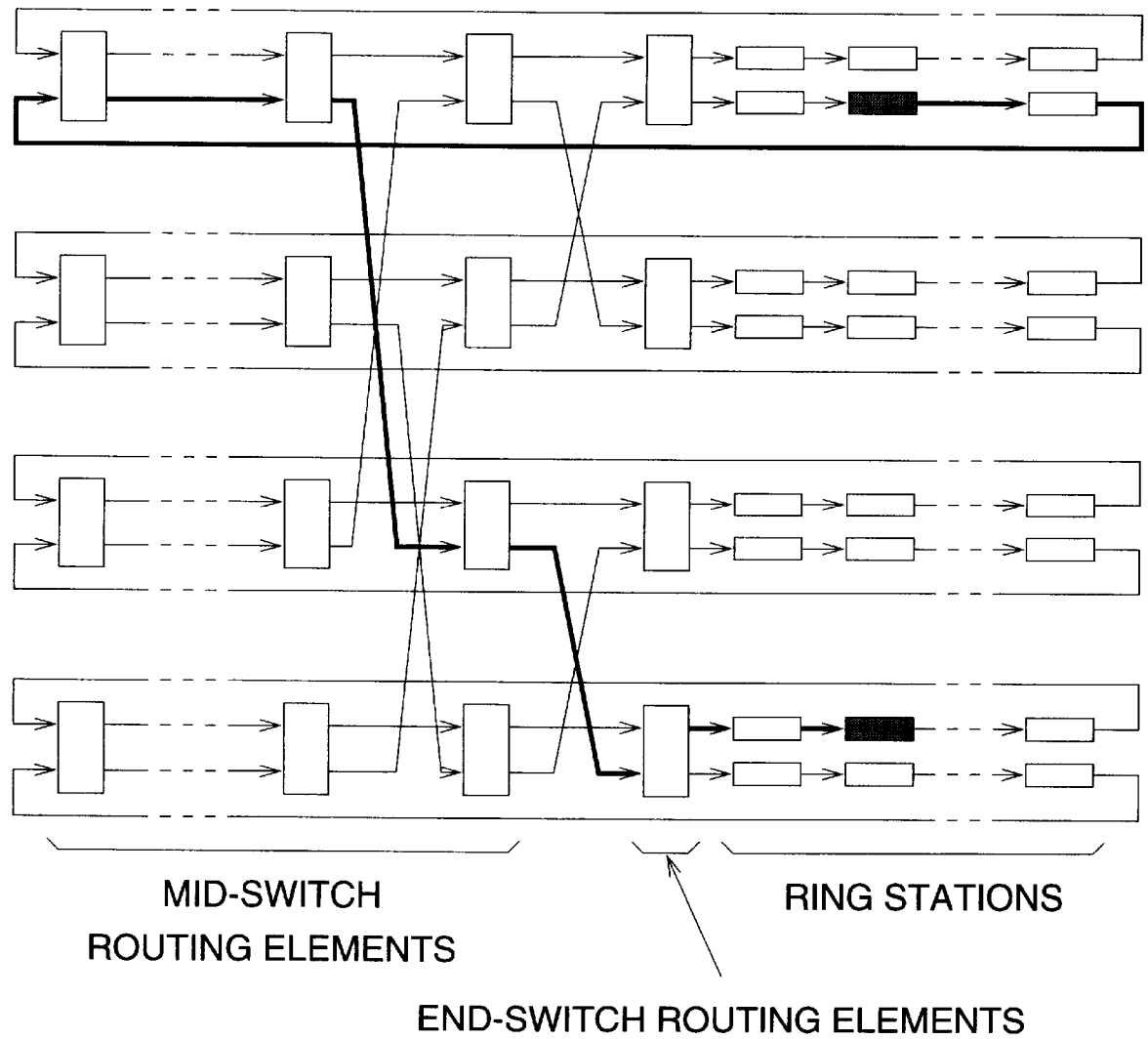
FIG. 9A is an illustration of packet routing in a fully operational switch.

Working together, routing elements 10 and 11 and ring stations perform routing of data packets towards the destination address. If all mid-switch routing elements 10 and vertical links 15 are operational, the routing through the switch is performed by a gradual reduction of the difference between the packet's destination ring pair identifier and the current ring pair identifier by following vertical links 15 where the corresponding bit is different. A mid-switch routing element 10 selects the ring 24 by examining the packet's destination ring selector. After the packet has arrived at the addressed ring 24 it is passed from ring station 12 to ring station 12 until the station 12 with the proper ring address is found. See FIG. 9A for an example of a packet trace.

Figure 9B:
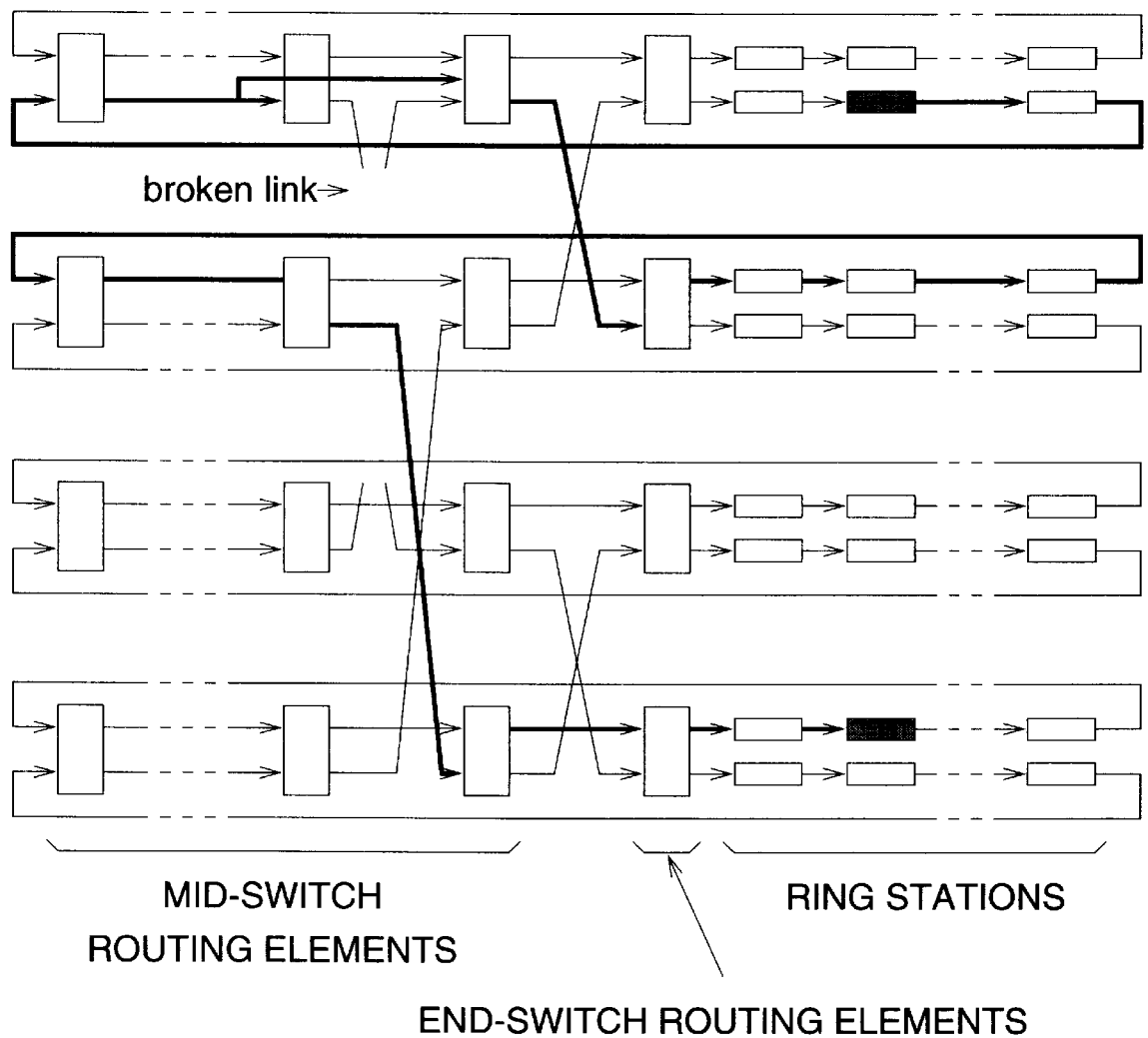
FIG. 9B is an illustration of packet routing in a switch with a vertical link failure.

If there is an inoperational vertical link 15 or faulty mid-switch routing element 11 the packet must perform an additional loop through the switch to pass through a working vertical link 15 with the corresponding position. Since the ring stations 12 compare the entire destination address (including ring pair identifiers), the packet which could not be delivered to the proper ring 24 because of a failure will be passed back through to the input of the switch, at a different place (see FIG. 9B for an example). A packet may be required to pass through multiple loops in case of multiple failures.

If there is only one bit of remaining difference between a packet's ring pair address and the current ring address, the simple forwarding of the packet back to a butterfly input will cause endless looping because that different bit obviously corresponds to the failed vertical link 15 or failed mid-switch routing element 10, therefore sending the packet back to the same input will not resolve the problem. In that case a deliberate mis-routing is used to route the packet by an alternative path. To guarantee the absence of complex endless loops caused by multiple mis-routings, the mis-routing is always done by mid-switch routing elements 10 in positions numbered lower than positions of failed links or elements.

In case of failure of a ring station 12 the packet addressed to that station will be returned to the input of the switch; however its L-bit will be set and since its destination ring address is the same as the address of the mid-switch routing elements 10 the L-bit will not be cleared, so the end-switch routing element 11 will discard it, thus preventing endless looping. Clearing the L-bit when a data packet traverses vertical link 15 allows the loop detection mechanism to be bypassed when multiple loops are needed to avoid failures.

Optional software-controlled misrouting can be used in accord with automatic failure avoidance to handle hard failure cases. In this case the operational status of vertical links 15 and mid-switch routing elements 10 should be communicated to information sources by separate communication means. Such software-controlled misrouting can employ a number of misrouting techniques well-known in the art.

An alternative use of the forced misrouting is to randomize packet routing in case of traffic patterns which create excessive contention at some links or routing elements.

Although the description above contains many specifics, these should not be construed as limiting the scope of the invention but as merely providing illustrations of some of the presently preferred embodiments of this invention. For example, the switch may have different assembly configurations (as shown in FIGS. 5A–5C), or may lack such features as forced misrouting or hot standby secondary assembly 23. Other similar variations would be obvious to one skilled in the art in view of the above teaching.

Accordingly, the invention should be considered to include any and all configurations, modifications, variations, combinations, equivalent arrangements or expansions falling within the scope of the following claims.

I claim:

1. A data packet routing device comprising:
a plurality of ring pairs, each of the ring pairs including:
a first ring including a series of first ring stations and a series of mid-switch routing elements followed by an end-switch routing element, and
a second ring including a series of second ring stations and the series of mid-switch routing elements followed by the end-switch routing element,
each mid-switch and end-switch routing element being adapted to switch data packets between the first and second rings, data packet outputs of the series of first and second ring stations being provided to inputs of the series of mid-switch routing elements, and data packet outputs of the end-switch routing element being provided to inputs of the series of first and second ring stations; and
vertical links that provide data packet passage between different ones of the ring pairs, the mid-switch routing elements being further adapted to switch data packets between the different ones of the ring pairs via the vertical links.

2. The device of claim 1, wherein adjacent ones of the ring stations, mid-switch routing elements, and end-switch routing element are connected in series by primary ring links.

3. The device of claim 2, wherein the first and second rings further comprise a plurality of bypass ring links adapted to provide data packet passage around a failed ring member of the ring stations, mid-switch routing elements and end-switch routing element.

4. The device of claim 3, wherein the bypass ring links connect two non-adjacent ones of the ring stations, mid-switch routing elements and end-switch routing element that are separated by the failed ring member.

5. The device of claim 3, wherein at least one of the routing elements comprises:
first and second routing controllers respectively associated with the first and second rings;
four FIFO buffers, two of the FIFO buffers being connected to the first routing controller, the other two being connected to the second routing controller;
first and second output arbiters respectively associated with the first and second rings, each output arbiter connected to one of the two FIFO buffers connected to the first routing controller and to one of the other two FIFO buffers connected to the second routing controller; and
first and second dual-input multiplexors respectively associated with the first and second rings, the multiplexors being respectively controlled by first and second failure signals so as to select data packets via one of a corresponding one of said primary ring links and a corresponding one of said bypass ring links, the first and second routing controllers respectively receiving data packets via the first and second multiplexors.

6. The device of claim 2, wherein first and second ring pairs commonly include a primary assembly of first and second mid-switch routing elements respectively associated with the first ring pair, and first and second end-switch routing elements respectively associated with the second ring pair, the first and second mid-switch routing elements being adapted to switch data packets between the first and second ring pairs.

7. The device of claim 6, wherein the first and second ring pairs further commonly include a secondary assembly of third and fourth mid-switch routing elements respectively associated with the first ring pair, and third and fourth end-switch routing elements respectively associated with the second ring pair, the third and fourth mid-switch routing elements being adapted to switch data packets between the first and second ring pairs; wherein the secondary assembly is connected in parallel to the primary assembly and provides hot standby reserve capability in the event of failure of the primary assembly.

8. The device of claim 1, wherein the ring pairs are arranged in consecutive ring pair number order, at least one of the vertical links between the ring pairs connecting a first mid-switch routing element in a first ring pair with a second mid-switch routing element in a second ring pair, the first mid-switch routing element being separated from the end-switch routing element in the first ring pair by N intermediate mid-switch routing elements, the second mid-switch routing element being separated from the end-switch routing element in the second ring pair by N−1 intermediate routing elements, a first ring pair number of the first ring pair and a second ring pair number of the second ring pair differing by $2^N$.

9. The device of claim 1, wherein at least one of the routing elements comprises:

first and second routing controllers respectively associated with the first and second rings;

four FIFO buffers, two of the FIFO buffers being connected to the first routing controller, the other two being connected to the second routing controller; and first and second output arbiters respectively associated with the first and second rings, each output arbiter connected to one of the two FIFO buffers connected to the first routing controller and to one of the other two FIFO buffers connected to the second routing controller.

10. The device of claim 9, wherein the routing controllers are adapted to route data packets to either of the first and second rings based on information contained in the data packets.

11. The device of claim 1, wherein the first and second rings further comprise vertical link attachments disposed between first and second adjacent routing elements of the mid-switch routing elements and end-switch routing element, each vertical link attachment being adapted to transmit an output data packet of the first adjacent routing element to a different one of the ring pairs via a corresponding one of the vertical links and to provide an input data packet to the second adjacent routing element from the different one of the ring pairs via the corresponding one of the vertical links.

12. A method for routing data packets in a device comprising a plurality of ring pairs having associated ring pair numbers, each ring pair comprising a first ring including a series of first ring stations and a series of mid-switch routing elements followed by an end-switch routing element, a second ring including a series of second ring stations and the series of mid-switch routing elements followed by the end-switch routing element, and vertical links between the ring pairs, the method comprising:

(a) routing a data packet received in a mid-switch routing element to a ring pair having an associated ring pair number equal to a destination ring pair number specified in the data packet;

(b) forwarding a data packet received in a mid-switch routing element to the end-switch routing element if the destination ring pair number specified in the data packet equals that associated with the ring pair of the mid-switch routing element;

(c) bypassing one of the mid-switch routing elements if a link failure is associated with the mid-switch routing element;

(d) routing a data packet received in an end-switch routing element to one of the first and second rings in accordance with a ring selector specified in the data packet;

(e) forwarding a data packet through the series of first and second ring stations until a ring station having a station address equal to a destination station address specified in the data packet is reached;

(f) forwarding a data packet through the series of first and second ring stations to the series of mid-switch routing elements if no ring station has a station address equal to the destination address specified in the data packet;

(g) discarding the packet at an end-switch routing element if the data packet has looped through the same ring pair associated with the end-switch routing element more than once.

13. The method of claim 12, further comprising:

(h) forcibly mis-routing a data packet received in a mid-switch routing element via an alternate path if a link failure is associated with a preceding mid-switch routing element.

14. The method of claim 12, wherein step (e) includes comparing a ring pair identifier, ring selector and station address of the data packet received by a ring station to those of the ring station, and if equal, retrieving the data packet; otherwise forwarding the data packet.

15. The method of claim 12, wherein step (a) includes:

(1) waiting for a data packet to arrive at one of first and second inputs;

(2) determining if a vertical link connected between a second output of the mid-switch routing element and another ring pair is operational;

(3) forwarding the packet to a first output if the data packet was received at the first input and the vertical link is not operational;

(4) computing a value diff of bitwise exclusive or between a ring pair identifier specified in the data packet and a ring pair number associated with the ring pair to which the mid-switch routing element belongs;

(5) checking if diff has logical one in a position corresponding the position of the mid-switch routing element in the ring pair to which the mid-switch routing element belongs, and if so, forwarding the data packet to the second output;

(6) checking if diff is zero or if diff has at least one logical one in a position not corresponding to the position of the mid-switch routing element in the ring pair, and if so, forwarding the data packet to the first output.

16. The method of claim 15, further comprising:

(7) checking if deliberate mis-routing is specified in the data packet, and if so, computing the value diff of bitwise exclusive or between the data packet's mis-routing ring pair identifier and the ring pair number of the mid-switch routing element.

17. The method of claim 12, wherein step (d) includes:

(1) waiting for a data packet to arrive at one of first and second inputs;

(2) discarding the data packet if the data packet has looped through the same ring pair more than once;

(3) if the data packet's ring selector is zero, forwarding the data packet to an output 0;

(4) forwarding the data packet to an output 1 if the data packet's ring selector is one.

18. The method of claim 17, further comprising:

(5) if forced mis-routing is specified in the data packet, and if the data packet's mis-routing ring pair identifier equals the ring pair number associated with the ring pair to which the end-switch routing element belongs, ending the forced mis-routing.

19. A device comprising a plurality of ring pairs, each of said ring pairs including:

first and second rings each having at least one ring station, said ring station being adapted to send and receive data packets;

a series of mid-switch routing elements that receives data packets from said ring stations of said first and second rings, said series of mid-switch routing elements being adapted to transmit data packets to other of said ring pairs and to receive data packets from other of said ring pairs;

an end-switch routing element that receives data packets from said series of mid-switch routing elements and from other of said ring pairs and is adapted to transmit data packets to one of said ring stations of said first and second rings; and at least one bypass ring link that provides packet passage around a failed one of said mid-switch routing elements.

* * * * *